May 23, 1939.   H. L. SPAUNBURG ET AL   2,159,109
LIQUID DISPENSING APPARATUS
Filed Aug. 11, 1937   8 Sheets-Sheet 1

Fig. 5.

May 23, 1939. H. L. SPAUNBURG ET AL 2,159,109
LIQUID DISPENSING APPARATUS
Filed Aug. 11, 1937 8 Sheets-Sheet 6

Inventors
Harvey L. Spaunburg,
Edward Wild,
Otto Wild, Jr.,
By Dickinson, Hurley, Byron & Knight Attys Patented May 23, 1939

2,159,109

UNITED STATES PATENT OFFICE 2,159,109

LIQUID DISPENSING APPARATUS

Harvey L. Spaunburg, Bristol, and Edward Wild, and Otto Wild, Jr., Hartford, Conn., assignors, by mesne assignments, to The Wayne Pump Company, Fort Wayne, Ind., a corporation of Maryland Application August 11, 1937, Serial No. 158,596

24 Claims. (Cl. 74—283)

This invention pertains to liquid dispensing apparatus.

Liquid dispensing apparatus now in use are of two principal types, namely, the so-called visible type, and the meter type. The more desirable of these two types is the meter type, which consists essentially of an operating pump connected to a source of liquid supply, the pump being adapted to supply liquid to a meter where it is measured, after which it is dispensed through the usual hose and nozzle connection. The meter is adapted to operate a clock or other recording mechanism to show the amount of liquid dispensed through the hose and nozzle. It is customary to provide this type of liquid dispensing apparatus with a card to be displayed somewhere on the casing adjacent the clock, the card being used to compute the price of any amount of gasoline or other liquid dispensed from the device. The objections to this method of computation are that for different localities different cards must be used as the prices vary, and of course the prices vary for the same localities from time to time. There is then the liability that the cards may not be supplied at the proper time, and also the objection that the figures on the computing card are so small that the customer purchasing gasoline from a dispensing station cannot see the numerals from his automobile, there being grave dangers of error in either case. There is a further objection that the prices on these cards are only for full gallon units, and if a fraction of a gallon is dispensed there is no way of accurately determining the cost of this amount. Also, in meter pumps there is no positive way to dispense only a unit, and so in case the registering hand of the clock overruns the unit measure, either the customer has to pay an estimated amount, or the service station owner has to lose this fraction of a unit to the customer.

In order to provide a liquid dispensing apparatus which will fulfill all service requirements, a computing pump has been devised wherein both price and the amount dispensed are indicated. This pump consists essentially of a motor driven pump, a meter, and a dispensing hose connected to the meter through a sight gauge, the meter being preferably of the displacement type for operating the indicating device.

The indicating device includes a variator which provides a ready adjustment between the amount computing portion of the clock and the price computing portion. In order to indicate the current price, numeral wheels or other indicia are provided above the meter so that the customer can readily see the prevailing price. As the current price changes, it is of course necessary to reset the computing device or the variator whereby a proper compensation is provided between the price and the amount; and in the present application means is provided between the current price indicia and the variator whereby the current price is regulated and controlled directly by the setting means of the variator.

It is therefore an object of this invention to provide a computing head for liquid dispensing apparatus which itself registers both the amount of liquid dispensed and the total price of such liquid dispensed.

Another object is to provide a computing head for liquid dispensing apparatus wherein means is provided for indicating the total price of any amounts of liquid dispensed as, for instance, gallons or fractions thereof, the means being adjustable at the liquid dispensing apparatus to correspond to any price variations of units dispensed.

A further object is to provide a readily adjustable variator means, and operating means interposed between the variator means and the current price indicia, whereby the current price indicia is regulated with the variator means.

A still further object is to provide a computing head for a liquid dispensing apparatus having a speed variator and registering means associated therewith, the adjustments for said speed variator being on a single panel.

Yet a further object is to provide a variator means for a computing head having adjustments thereon which automatically tend for complete variator engagement.

Another further object is to provide a speed variator for a liquid dispensing apparatus which is not reversible, is inexpensive to manufacture and maintain, and fulfills all requirements of manufacture and service.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

In the computer type of pump shown, the computing head, including the variator and registering or indicating mechanism, is adapted to be associated with a liquid dispensing apparatus such as illustrated in Jauch et al., Patent No. 1,888,533, granted November 22, 1932, and driven by the meter thereof. In the construction shown in said patent a meter shaft is operated in accordance with liquid passing through the meter and drives an operating shaft which, in turn, drives the variator connected to indicating means for showing the cost of the liquid dispensed, the meter shaft also driving indicating means for showing the amount of the liquid dispensed.

Thus the meter shaft is adapted to be connected to an operating shaft 30 which, in the construction illustrated, is journaled as at 32 in the base plate 34 of the variator housing 36. The operating shaft 30 is provided with the gear 38 meshing with the internal gear 40 provided inwardly of the vertically disposed gear cone 42, said cone being provided with suitable gear steps or concentrically arranged gearing. The gear cone is non-rotatably mounted on the drive shaft 44, the drive shaft 44 being journaled as at 46 in the support 48 secured as at 50 to the base plate, the upper end of the operating shaft being likewise journaled as at 52 to said support. The drive shaft 46 extends upwardly through a bearing 54 provided in the top plate 56 of the housing 36, and the upper end of said drive shaft is provided with the gear 58 which is operatively connected to the bevel gear 60 for operating the bottom banks of amount counters 62, said banks of counters being removable from the housing 64 as for replacement or repair. The housing may contain suitable set-back, shutter control, etc., mechanism. The counters 62 are geared directly to the drive shaft and indicate the amount of liquid dispensed, and banks of counters 66 are likewise removably secured to the housing 64 and are adapted to indicate the price of the liquid dispensed computed in accordance with the setting of the variator, all as will be described.

These counters are operated by means of the gear 68 operatively connected to the gear 70 provided on the vertically extending shaft 72, said shaft being journaled as at 74 to a suitable support 76 provided on the housing 64, the gears provided being substantially of the hypoid type. Suitable reset mechanism indicated generally at 78 is provided for resetting the counters to zero. The details of the counters, shutter control, and reset mechanism, and the operation thereof, is known as it is of the well known Veeder-Root type.

The shaft 72 is provided with the gear 80 meshing with the gear 82 provided on the driven shaft 84 which extends through the top plate 56. The driven shaft 84 is journaled as at 86 in the top plate 56 and inwardly of the housing is provided with the gear 88, said gear meshing with the gear 90 forming one of the gears of the differential. The gear 90 is also connected to the sales totalizer 100 through the gear train 92 and 94 pivoted as at 96 and 98 to the top plate 56, which totalizer is not resettable to zero and is permanently connected through the gear train 92 and 94 to the differential.

Preferably mounted directly below the sales totalizer 100 there is a non-resettable gallons totalizer 102 which is connected through the bevel gear 104 to the bevel gear 106 mounted on shaft 108, said shaft being suitably journaled as at 110 to supports provided in the housing 36. Said supports may be provided on the central portion 109 of the three-part housing 36, said parts being held assembled by means of the tie rods 111. The shaft 108 is provided with the gear 112 meshing with gear 114 provided on the shaft 116 likewise suitably journaled as at 118 to suitable supports provided on the central portion 109 of the housing, said shaft 116 being provided with the bevel gear 120 meshing with the bevel gear 122 mounted on and driven by the drive shaft 44. The gear 122 may be provided with an extended portion forming a bearing 123 for a portion of the differential. The gear 90 is provided with the gear 124 meshing with the gears 126 provided on the gears 128, said gears being pivotally mounted as at 130 to the gear 132.

The gear 132 is rotatably mounted as at 134 on the bearing 136, and said gear 132 meshes with and is driven by a tens cent integrator gear 138 non-rotatably mounted on the supplementary shaft 140 disposed in parallel relation to the shaft 44. The gear 128 is operatively connected to the gear 142 provided on the bearing 136, said bearing likewise being integral with the gear 144 meshing with gear 146 provided on gear 148. The gear 148 is rotatably mounted on the shaft 150 provided on the cents integrator gear 152. The gear 148 meshes with the gear 154 provided on the bearing 156, and the gear 152 is rotatably mounted as at 158 on said bearing. The bearing 156 is provided on the tenths cents integrator gear 160. The gear 152 is operatively connected to the gear 162 which is provided with the recess 164 and is non-rotatably mounted on the supplementary shaft 166 likewise disposed in parallel relation to the shaft 44.

The tenths cent integrator gear 160 is operatively connected to the gear 168 provided with the recess 170 and non-rotatably mounted on the tenths cent supplementary shaft 172 likewise disposed in parallel relation to the drive shaft 44. The supplementary shafts are suitably journaled as at 176 and 178 to the top and base plates 56 and 34 respectively. Each of the supplementary shafts is provided with a keyway 180 to which the gears 182, 184 and 186 are keyed whereby said gears are slidably but non-rotatably mounted on the respective supplementary shafts. The gears 182, 184 and 186 are operatively connected, respectively, to the cone engaging gears 188, 190 and 192, pivoted as at 194, 196 and 198 to the gear shifting arms 200, 202 and 204, the gears 188, 190 and 192 being so disposed, as shown, that rotation of the cone does not tend to throw them out of mesh with said cone. The gear shifting arms 200, 202 and 204 are mounted on housings 206, 208 and 210, which housings are provided with spaced bearings 212 whereby said housings are slidable on the respective shafts, it being seen that when the housings 206 and 208 are in their topmost position they are adapted to be received in the recesses 170 and 164 of the gears 168 and 162 respectively, whereby the overall height of the variator housing may be kept at a minimum.

On a portion of the housings 206, 208 and 210 are provided the circular racks 214, 216 and 218 meshing with gears 220, 222 and 224 slidably but non-rotatably mounted on the setting shafts 226, 228 and 230, said shafts being arranged in parallel arrangement and being provided with the setting knobs 232, 234 and 236 arranged adjacent each other so that the settings may all be accomplished on one panel 238 of the housing 36. The shafts 226, 228 and 230 are provided with the offset racks 240, 242 and 244, said shafts extending through suitable bearings 246, 248 and 250 provided on said offset racks whereby the shafts are rotatably mounted with respect to the racks, but relative movement of translation is prevented between the respective shafts and the respective racks by the spaced collars 252 and 254 provided on each of the shafts on opposite sides of the bearings.

The racks are also provided with the outstanding positioning arms 256, 258 and 260 having slidable cooperation with an adjacent ledge of the central portion of the housing for preventing any tendency of rotative movement of said offset racks. The offset racks are adapted to mesh with vertically extending elongated gear teeth 262, 264 and 266 provided on the respective housings 206, 208 and 210, and extending substantially the length of said housings. The shafts 226, 228 and 230 are suitably journaled in the housing 36, and adjacent the opposite ends of said shafts from the setting knobs there are provided setting cam members or index hubs 268, 270 and 272, the cam members being notched as at 274 in accordance with the calibrations of the device, said cams being provided with said notches 274 adapted to receive the stationary positioning member 276 provided on the housing, it being noted that between the notches there are provided sloping portions 278. The coil springs 280, 282 and 284 are provided on the shafts 226, 228 and 230, and on shafts 226 and 230 the springs 280 and 284 are disposed between the setting cams 268 and 272 and suitable stops or bearings 286 provided on the housing, the spring 282 being provided on the shaft 228 between the shoulder 288 and a portion of the housing.

Thus the coil springs urge the setting cams 268, 270 and 272 toward the stops 276. If a proper setting is not made by the knob, that is, if any gear 188, 190 or 192 is not completely meshed with the selected gear step, the stop 176 will engage on one of the sloping portions 278 and the springs will be of sufficient strength to cause the cams to be rotated until the stop 276 has fallen into one of the notches 274, in which position the shifting gear will be in complete engagement with a step of the gear cone.

In order to visibly indicate the position of the setting knobs, the shafts 226, 228 and 230 are provided with means operatively connecting said shafts to daily price indicating means which, in the form shown, are the tenths including one quarter and three quarters, cents and tens of cents numeral wheels 290, 292 and 294 disposed at opposite sides of the computing head. The shafts 226 and 230 are provided with the spaced gears 296 and 298 respectively, said gears being slidably but non-rotatively mounted with respect to said shafts. The gears 296 and 298 are adapted to mesh with the teeth of pairs of parallelly disposed racks 300 and 302, and 304 and 306 respectively. Said racks extend to the associated numeral wheels 290 and 294 at opposite sides of the computing head and are connected through the gear trains 308 and 310, and 312 and 314 to the respective numeral wheels, it being seen that the pairs of racks are only connected at one side of the computing head to the respective numeral wheels, that is, one rack only operates a single numeral wheel at a single side of the counter.

The center shaft 228 is provided with the gear 316 non-rotatably but slidably mounted with respect to said shaft, said gear meshing with a suitable rack 318 extending to opposite sides of the computing head and being suitably connected through the gear train 320 and 322 to the central numeral wheels 292.

Thus it will be seen that when it is desired to set the variator, the knobs 232, 234 or 236 are first pulled longitudinally to cause the shafts 226, 228 and 230 to move the offset racks 240, 242 and 244 whereby rotation of the housings 262, 264 or 266 is effected, thus rotating the respective gear shifting arms 200, 202 or 204, causing the gear wheels 188, 190 or 192 to be disconected from the respective gear steps. Rotation of the shafts 226, 228 or 230 will also cause rotation of the daily price indicating wheels 290, 292 and 294 through the respective racks, thereby facilitating the finding of the chosen gear steps. The springs 280, 282 and 284 urge the setting cams into a position where the respective notches will be locked in position by engagement with the members 276, thus preventing unauthorized disengagement between the gear steps and the associated gears 190, 192 and 194.

Figure 1:
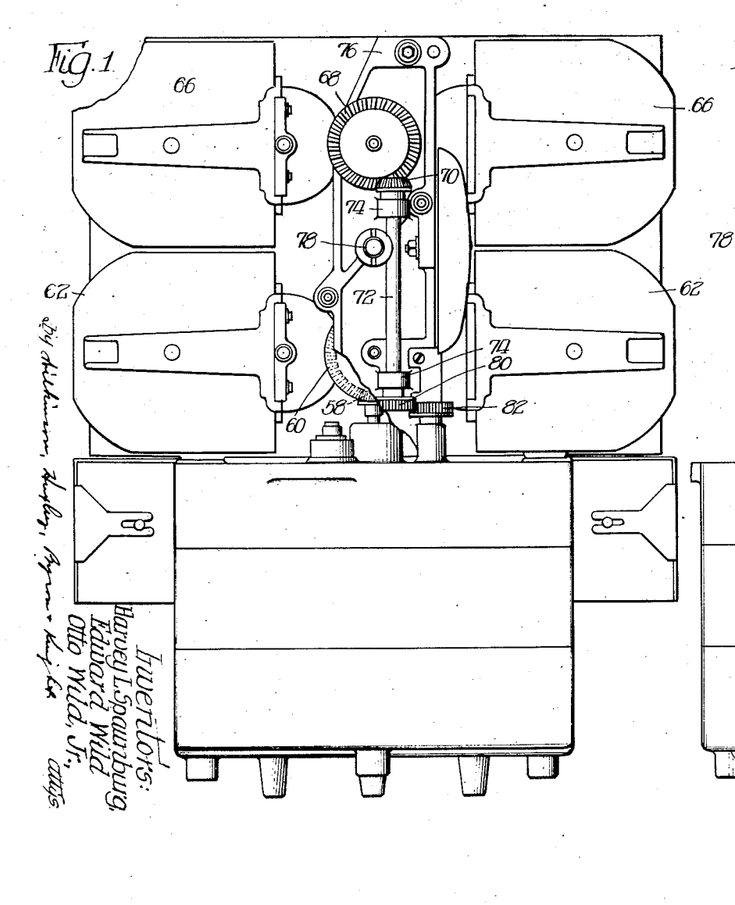
Figure 1 is a side elevation of the variator and indicating mechanism for liquid dispensing apparatus.
Figure 2:
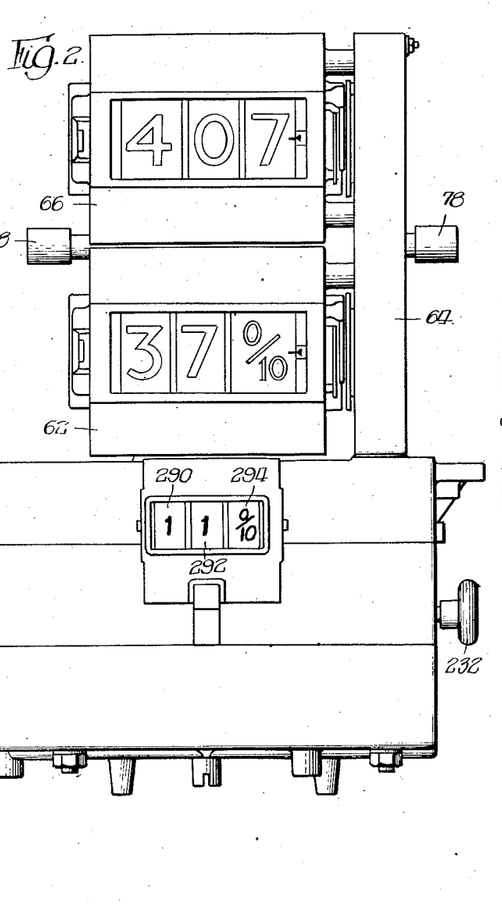
Figure 2 is a front elevation of the variator and indicating mechanism shown in Figure 1, the same looking toward the left as viewed in said figure.
Figure 3:
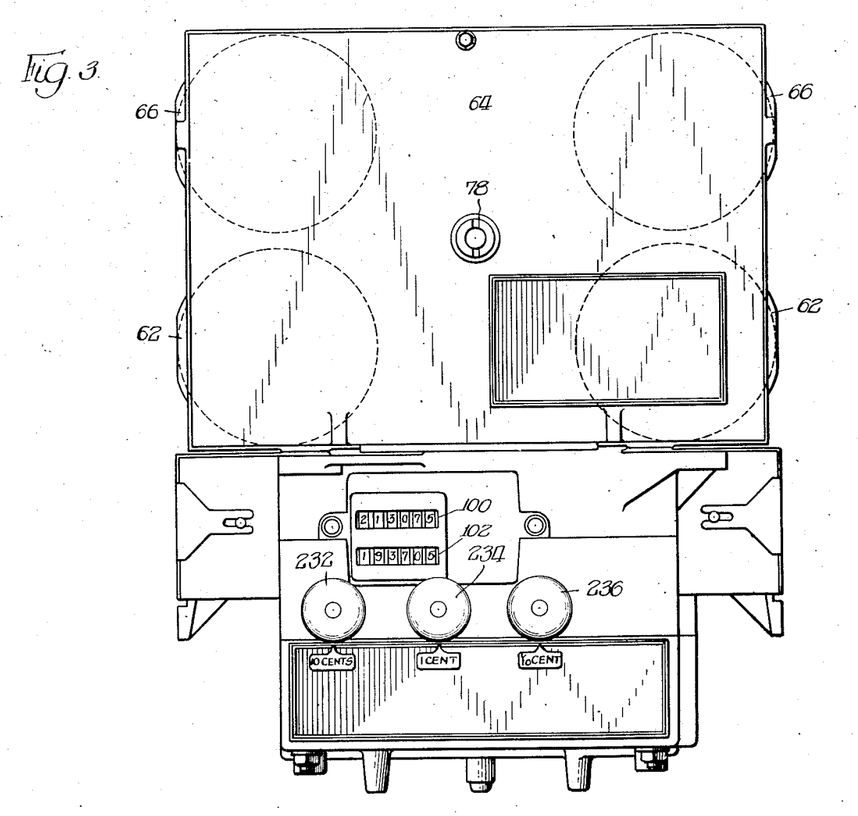
Figure 3 is a side elevation of the variator and indicating mechanism taken at the opposite side thereof from that shown in Figure 1.
Figure 4:
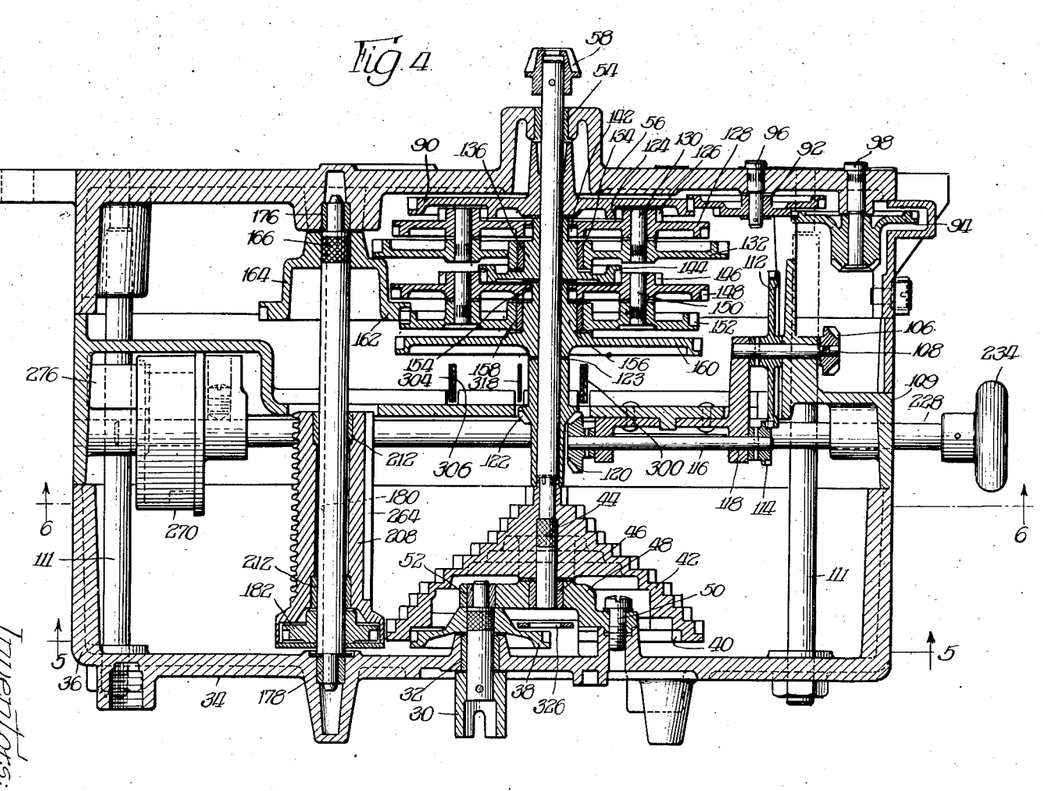
Figure 4 is a vertical sectional elevation through the variating mechanism, the same being taken substantially in the plane as indicated by the line 4—4 of Figure 5.
Figure 5:
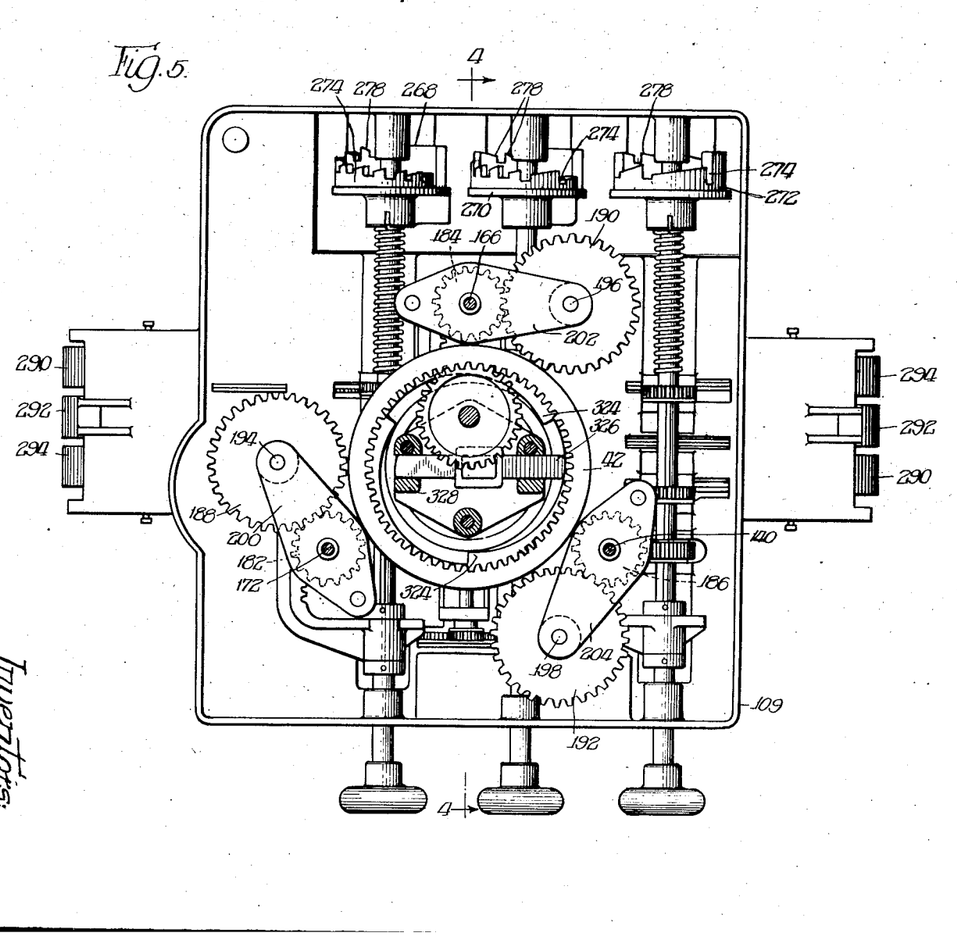
Figure 5 is a bottom plan view of a portion of the variator mechanism, the same being taken substantially in the plane as indicated by the line 5—5 of Figure 4 showing the parts set for zero position.
Figure 6:
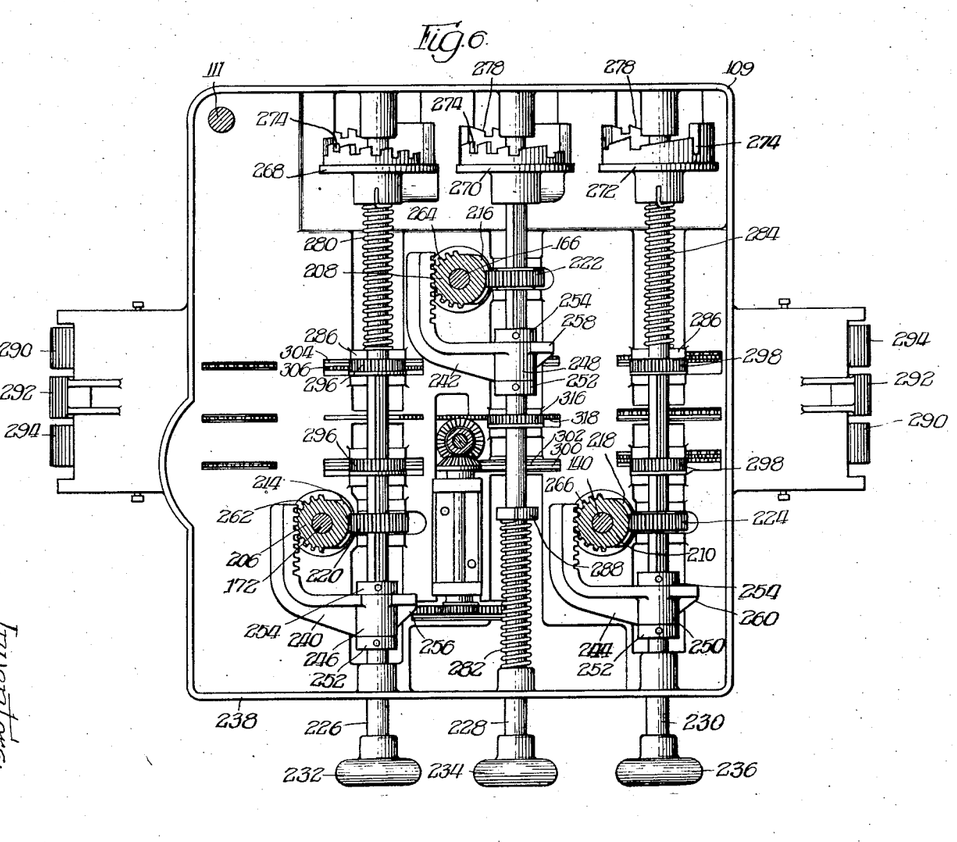
Figure 6 is a bottom plan view of a portion of the variator mechanism taken substantially in the plane as indicated by the line 6—6 of Figure 4.
Figure 7:
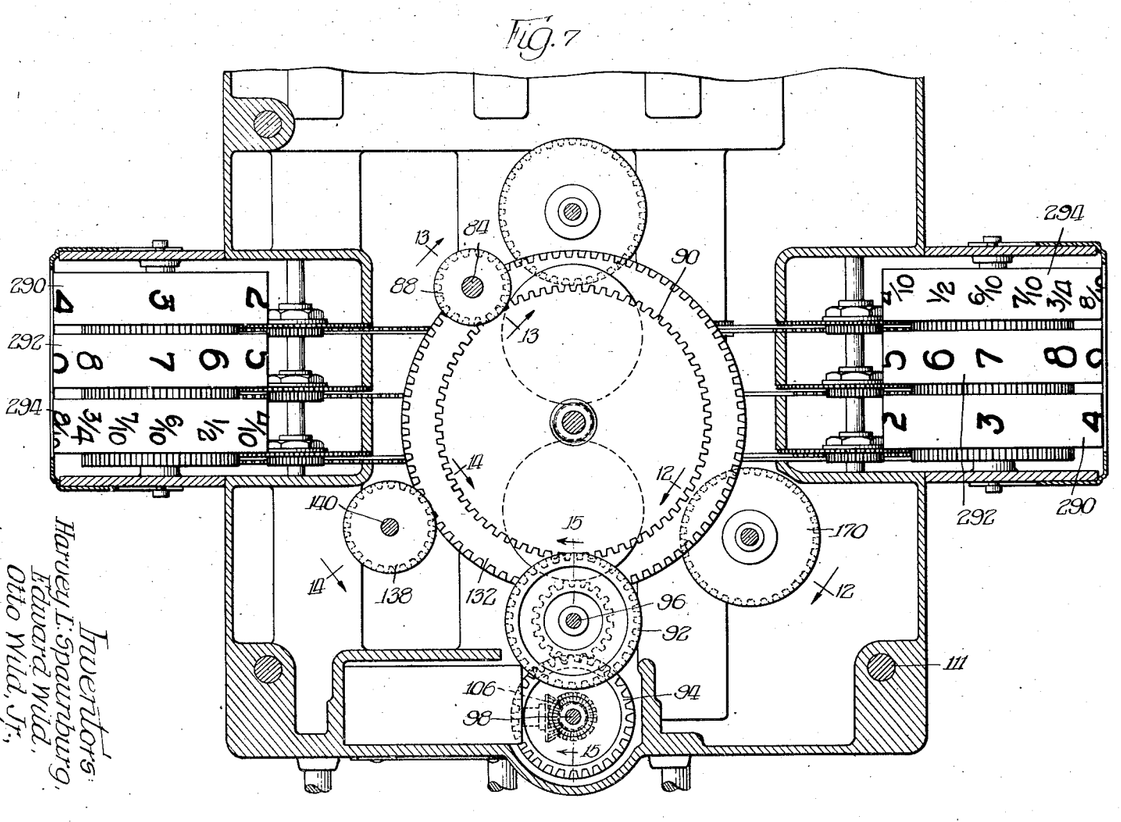
Figure 7 is an enlarged top plan view of a portion of the variator showing a detail of the price synchronizing means.
Figure 8:
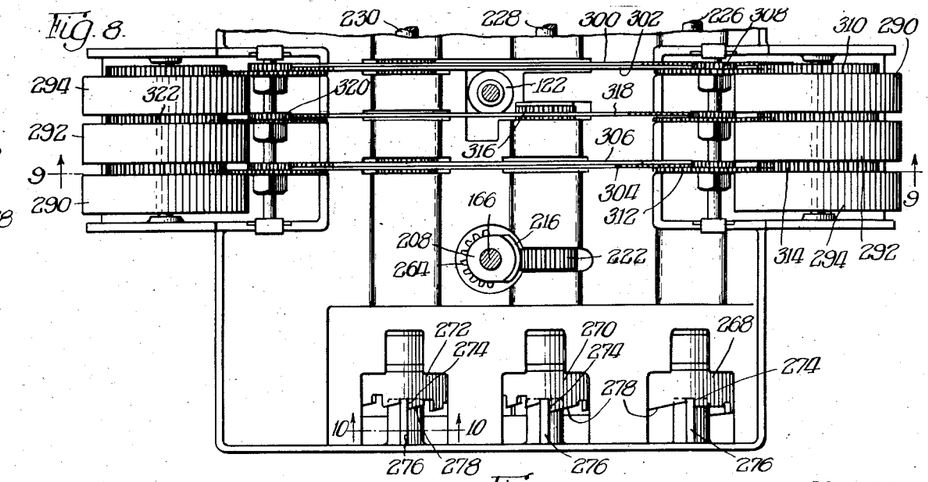
Figure 8 is an enlarged fragmentary top plan view of a portion of the variator showing another detail of the price synchronizing means.
Figure 9:
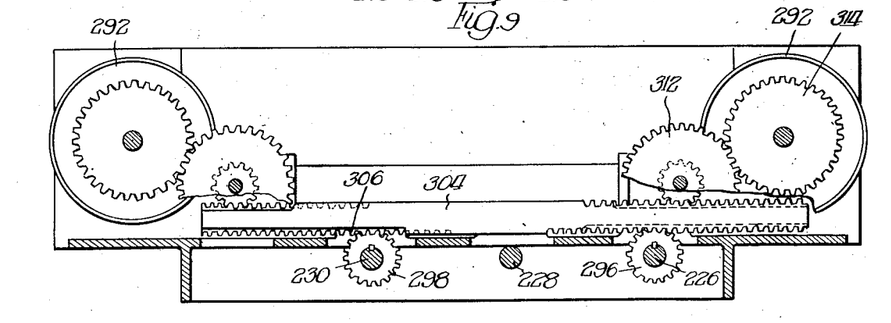
Figure 9 is a transverse sectional elevation taken substantially in the plane as indicated by the line 9—9 of Figure 8.
Figure 10:
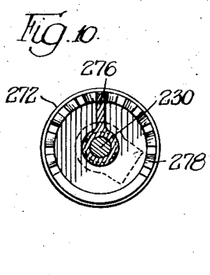
Figure 10 is a sectional elevation taken substantially in the plane as indicated by the line 10—10 of Figure 8.
Figure 11:
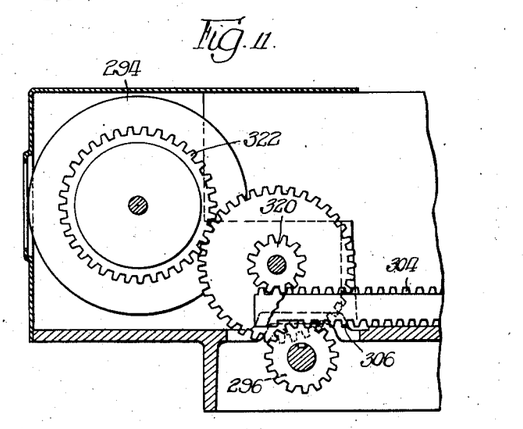
Figure 11 is an enlarged sectional elevation showing a detail of one of the operating mechanisms of one of the daily price indicating means.
Figure 12:
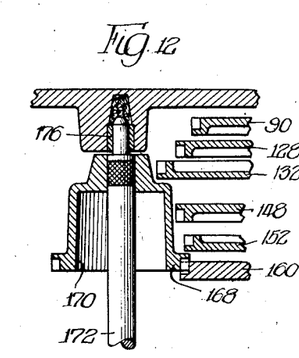
Figure 12 is an enlarged sectional elevation showing one of the differential or integrator drive connections, the same being taken substantially in the plane as indicated by the line 12—12 of Figure 7.
Figure 13:
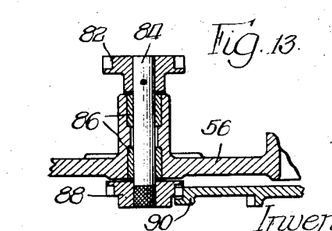
Figure 13 is a transverse sectional elevation taken substantially in the plane as indicated by the line 13—13 of Figure 7 showing the driven shaft connection from the speed variator.
Figure 14:
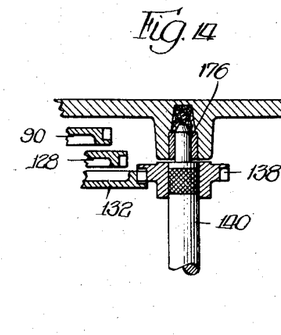
Figure 14 is an enlarged sectional elevation taken substantially in the plane as indicated by the line 14—14 of Figure 13.
Figure 15:
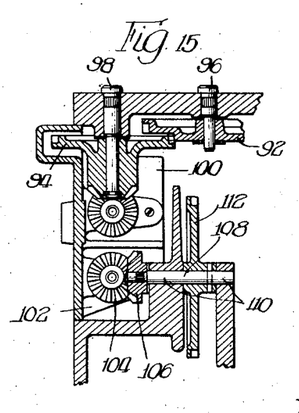
Figure 15 is an enlarged sectional elevation through the driving mechanism for the totalizing counters, the same being taken substantially in the plane as indicated by the line 15—15 of Figure 7.

In order to prevent reverse movement of the counters, such as in resetting, or where expansion of liquid tends to rotate the meter in a reverse direction, the cone is provided with a suitable number of inwardly extending teeth or stops 324 which are adapted to reciprocate the locking member 326 slidably mounted in the housing 328 mounted within the bottom of the gear cone. The cone driving in a normal operation, in counter-clockwise direction as viewed in Figure 5, will merely reciprocate member 326, but should the cone tend to rotate in an opposite direction, it will be prevented from doing so by engagement of the respective members 324 with the locking member 326.

It is to be understood that we do not wish to be limited by the exact embodiments of the device shown, which are merely by way of illustration and not limitation, as various and other forms of the device will of course be apparent to those skilled in the art without departing from the spirit of the invention or the scope of the claims.

What is claimed is:

1. In a device of the character described, the combination of a drive shaft adapted to be connected to indicating mechanism, gear steps mounted to rotate with said drive shaft and around a vertical axis, a plurality of supplemental shafts disposed adjacent said gear steps and being substantially parallel with said drive shaft, a driven shaft adapted to be connected to other indicating mechanism, differentially arranged gear means operatively connecting said supplemental shafts to said driven shaft, a gear slidably and non-rotatably mounted on each of said supplemental shafts, a movable housing member mounted to move with each of said last named gears, a shifting gear carried by each of said housing members operatively connected to the slidable gear and adapted to engage a selected gear step, and means for selectively engaging said shifting gear with said gear steps, said means including a plurality of movable members parallelly disposed and so arranged that the setting can be effected from one side of said device, the axes of said last named movable members being substantially at right angles to the axes of said supplementary shafts, and an operative connection between said movable members and the respective housing members.

2. In a device of the character described, the combination of a drive shaft adapted to be connected to indicating mechanism, gear steps mounted to rotate with said drive shaft and around a vertical axis, a plurality of supplemental shafts disposed adjacent said gear steps and being substantially parallel with said drive shaft, a driven shaft adapted to be connected to other indicating mechanism, means operatively connecting said supplemental shafts to said driven shaft, a gear slidably and non-rotatably mounted on each of said supplemental shafts, a movable housing member mounted to move with each of said last named gears, a shifting gear carried by each of said housing members operatively connected to the slidable gear and adapted to engage a selected gear step, and means for selectively engaging said shifting gear with said gear steps, said means including a plurality of rotatable and bodily movable members parallelly disposed and so arranged that the setting can be effected from one side of the device.

3. In a device of the character described, the combination of a drive shaft adapted to be connected to indicating mechanism, gear steps mounted to rotate with said drive shaft and around a vertical axis, a supplemental shaft disposed adjacent said gear steps and being substantially parallel to the axis of said gear steps, a driven shaft adapted to be connected to other indicating means, means connecting said driven and supplemental shafts, a housing member movably mounted on said supplemental shaft and provided with an arm having a gear adapted to engage the selected gear steps, a connection between said last named gear and said supplemental shaft, said housing member being provided with a rack and an elongated gear, a setting shaft, a rack provided on said setting shaft engaging said elongated gear, a pinion slidably but non-rotatably mounted with respect to said setting shaft and engaging said first named rack, and means for preventing movement of said setting shaft when said first named gear is in engagement with a selected gear step.

4. In a device of the character described, the combination of a drive shaft adapted to be connected to indicating mechanism, gear steps mounted to rotate with said drive shaft, a vertically disposed supplemental shaft disposed adjacent said gear steps and being substantially parallel to the axis of said gear steps, a driven shaft adapted to be connected to other indicating means, means connecting said driven and supplemental shafts, a housing member movably mounted on said supplemental shaft and provided with an arm having a gear adapted to engage the selected gear steps, a connection between said last named gear and said supplemental shaft, said housing member being provided with a rack and an elongated gear, a setting shaft, a rack provided on said setting shaft engaging said elongated gear, a pinion slidably but non-rotatably mounted with respect to said setting shaft and engaging said first named rack, an index member and a stop member associated with said setting shaft and being so constructed and arranged that the index and stop members may be engaged to prevent rotation of said housing member and disconnection of said first named gear and a selected gear step until said setting shaft has been bodily moved.

5. In a device of the character described, the combination of a drive shaft adapted to be connected to indicating mechanism, gear steps mounted to rotate with said drive shaft, a vertically disposed supplemental shaft disposed adjacent said gear steps and being substantially parallel to the axis of said gear steps, a driven shaft adapted to be connected to other indicating means, means connecting said driven and supplemental shafts, a housing member movably mounted on said supplemental shaft and provided with an arm having a gear adapted to engage the selected gear steps, a connection between said last named gear and said supplemental shaft, said housing member being provided with a rack and an elongated gear, a setting shaft, a rack provided on said setting shaft engaging said elongated gear, a pinion slidably but non-rotatably mounted with respect to said setting shaft and engaging said first named rack, an index member and a stop member associated with said setting shaft and being so constructed and arranged that the index and stop members may be engaged to prevent rotation of said housing member and disconnection of said first named gear and a selected gear step until said setting shaft has been bodily moved, and resilient means urging said index and stop members into engagement.

6. In a device of the character described, the combination of a drive shaft adapted to be connected to indicating mechanism, gear steps mounted to rotate with said drive shaft, a supplemental shaft disposed adjacent said gear steps and being substantially parallel to the axis of said gear steps, a driven shaft adapted to be connected to other indicating means, means connecting said driven and supplemental shafts, a housing member movably mounted on said supplemental shaft and provided with an arm having a gear adapted to engage the selected gear steps, a connection between said last named gear and said supplemental shaft, said housing member being provided with a rack and an elongated gear, a setting shaft, a rack provided on said setting shaft engaging said elongated gear, a pinion slidably but non-rotatably mounted with respect to said setting shaft and engaging said first named rack, an index member on said setting shaft, a stop member disposed adjacent said index member, said stop and index members being so constructed and arranged that they may be engaged to prevent rotation of said housing member and disconnection of said first named gear and a selected gear step until said setting shaft has been bodily moved.

7. In a device of the character described, the combination of a drive shaft adapted to be connected to indicating mechanism, gear steps mounted to rotate with said drive shaft, a supplemental shaft disposed adjacent said gear steps and being substantially parallel to the axis of said gear steps, a driven shaft adapted to be connected to other indicating means, means connecting said driven and supplemental shafts, a housing member movably mounted on said supplemental shaft and provided with an arm having a gear adapted to engage the selected gear steps, a connection between said last named gear and said supplemental shaft, said housing member being provided with a rack and an elongated gear, a setting shaft, a rack provided on said setting shaft engaging said elongated gear, a pinion slidably but non-rotatably mounted with respect to said setting shaft and engaging said first named rack, an index member on said setting shaft, a stop member disposed adjacent said index member, said stop and index members being so constructed and arranged that they may be engaged to prevent rotation of said housing member and disconnection of said first named gear and a selected gear step until said setting shaft has been bodily moved, and resilient means urging said index and stop members into engagement.

8. In a device of the character described, the combination of a drive shaft adapted to be connected to indicating mechanism, gear steps mounted to rotate with said drive shaft, a vertically disposed supplemental shaft disposed adjacent said gear steps and being substantially parallel to the axis of said gear steps, a driven shaft adapted to be connected to other indicating means, means connecting said driven and supplemental shafts, a housing member movably mounted on said supplemental shaft and provided with an arm having a gear adapted to engage the selected gear steps, a connection between said last named gear and said supplemental shaft, said housing member being provided with a rack and an elongated gear, a setting shaft, a rack provided on said setting shaft engaging said elongated gear, a pinion slidably but non-rotatably mounted with respect to said setting shaft and engaging said first named rack, an index member and a stop member associated with said setting shaft, said index member being notched, the notches being so disposed that when said stop member is in a notch said first named gear engages a corresponding gear step, said index member being provided with sloping portions between said notches, and resilient means urging said index and stop members into engagement, said resilient means causing relative movement between said index and stop members if said stop member engages a sloping portion whereby said notches will receive said stop member and said first named gear will mesh with a gear step.

9. In a device of the character described, the combination of a drive shaft adapted to be connected to indicating mechanism, gear steps mounted to rotate with said drive shaft, a supplemental shaft disposed adjacent said gear steps and being substantially parallel to the axis of said gear steps, a driven shaft adapted to be connected to other indicating means, means connecting said driven and supplemental shafts, a housing member movably mounted on said supplemental shaft and provided with an arm having a gear adapted to engage the selected gear steps, a connection between said last named gear and said supplemental shaft, said housing member being provided with a rack and an elongated gear, a setting shaft, a rack provided on said setting shaft engaging said elongated gear, a pinion slidably but non-rotatably mounted with respect to said setting shaft and engaging said first named rack, means for preventing movement of said setting shaft when said first named gear is in engagement with a selected gear step, indicating means for showing the relative position of said gear steps and said first named gear, operative connections between said indicating means and said setting shaft including a gear slidably but non-rotatively connected to said setting shaft, and a rack and pinion connection from said last named gear and said indicating means.

10. In a device of the character described, the combination of a drive shaft adapted to be connected to indicating mechanism, gear steps mounted to rotate with said drive shaft, a supplemental shaft disposed adjacent said gear steps and being substantially parallel to the axis of said gear steps, a driven shaft adapted to be connected to other indicating means, means connecting said driven and supplemental shafts, a housing member movably mounted on said supplemental shaft and provided with an arm having a gear adapted to engage the selected gear steps, a connection between said last named gear and said supplemental shaft, said housing member being provided with a rack and an elongated gear, a setting shaft, a rack provided on said setting shaft engaging said elongated gear, a pinion slidably but non-rotatably mounted with respect to said setting shaft and engaging said first named rack, an index member and a stop member associated with said setting shaft and being so constructed and arranged that the index and stop members may be engaged to prevent rotation of said housing member and disconnection of said first named gear and a selected gear step until said setting shaft has been bodily moved, indicating means for showing the relative position of said gear steps and first named gear, operative connections between said indicating means and said setting shaft including a gear slidably but non-rotatably connected to said setting shaft, and a rack and pinion connection from said last named gear and said indicating means.

11. In a device of the character described, the combination of a drive shaft adapted to be connected to indicating mechanism, gear steps mounted to rotate with said drive shaft, a supplemental shaft disposed adjacent said gear steps and being substantially parallel to the axis of said gear steps, a driven shaft adapted to be connected to other indicating means, means connecting said driven and supplemental shafts, a housing member movably mounted on said supplemental shaft and provided with an arm having a gear adapted to engage the selected gear steps, a connection between said last named gear and said supplemental shaft, said housing member being provided with a rack and an elongated gear, a setting shaft, a rack provided on said setting shaft engaging said elongated gear, a pinion slidably but non-rotatably mounted with respect to said setting shaft and engaging said first named rack, an index member and a stop member associated with said setting shaft and being so constructed and arranged that the index and stop members may be engaged to prevent rotation of said housing member and disconnection of said first named gear and a selected gear step until said setting shaft has been bodily moved, resilient means urging said index and stop members into engagement, indicating means for showing the relative position of said gear steps and first named gear, operative connections between said indicating means and said setting shaft including a gear slidably but non-rotatably connected to said setting shaft, and a rack and pinion connection from said last named gear and said indicating means.

12. In a device of the character described, the combination of a drive shaft adapted to be connected to indicating mechanism, gear steps mounted to rotate with said drive shaft, a supplemental shaft disposed adjacent said gear steps and being substantially parallel to the axis of said gear steps, a driven shaft adapted to be connected to other indicating means, means connecting said driven and supplemental shafts, a housing member movably mounted on said supplemental shaft and provided with an arm having a gear adapted to engage the selected gear steps, a connection between said last named gear and said supplemental shaft, said housing member being provided with a rack and an elongated gear, a setting shaft, a rack provided on said setting shaft engaging said elongated gear, a pinion slidably but non-rotatably mounted with respect to said setting shaft and engaging said first named rack, an index member on said setting shaft, a stop member disposed adjacent said index member, said stop and index members being so constructed and arranged that they may be engaged to prevent rotation of said housing member and disconnection of said first named gear and a selected gear step until said setting shaft has been bodily moved, indicating means for showing the relative position of said gear steps and first named gear, operative connections between said indicating means and said setting shaft including a gear slidably but non-rotatably connected to said setting shaft, and a rack and pinion connection from said last named gear and said indicating means.

13. In a device of the character described, the combination of a drive shaft adapted to be connected to indicating mechanism, gear steps mounted to rotate with said drive shaft, a supplemental shaft disposed adjacent said gear steps and being substantially parallel to the axis of said gear steps, a driven shaft adapted to be connected to other indicating means, means connecting said driven and supplemental shafts, a housing member movably mounted on said supplemental shaft and provided with an arm having a gear adapted to engage the selected gear steps, a connection between said last named gear and said supplemental shaft, said housing member being provided with a rack and an elongated gear, a setting shaft, a rack provided on said setting shaft engaging said elongated gear, a pinion slidably but non-rotatably mounted with respect to said setting shaft and engaging said first named rack, an index member on said setting shaft, a stop member disposed adjacent said index member, said stop and index members being so constructed and arranged that they may be engaged to prevent rotation of said housing member and disconnection of said first named gear and a selected gear step until said setting shaft has been bodily moved, resilient means urging said index and stop members into engagement, indicating means for showing the relative position of said gear steps and said first named gear, operative connections between said indicating means and said setting shaft including a gear slidably but non-rotatably connected to said setting shaft, and a rack and pinion connection from said last named gear and said indicating means.

14. In a device of the character described, the combination of a drive shaft adapted to be connected to indicating mechanism, gear steps mounted to rotate with said drive shaft, a supplemental shaft disposed adjacent said gear steps and being substantially parallel to the axis of said gear steps, a driven shaft adapted to be connected to other indicating means, means connecting said driven and supplemental shafts including a gear on said supplemental shaft having a recess therein, a housing member movably mounted on said supplemental shaft and provided with an arm having a gear adapted to engage the selected gear steps, a connection between said last named gear and said supplemental shaft, and means for moving said housing member within said recess to selectively engage certain of said gear steps with said first named gear.

15. In a device of the character described, the combination of a shaft adapted to be operatively connected to indicating means, gear means concentrically arranged about a vertical axis and rotated by said shaft, supplemental shafts disposed adjacent said gear means, differential means operatively connected to said supplemental shafts and adapted to be connected to a second indicating means, a gear carried by each of said supplemental shafts for rotating said shafts, said gears being engageable with selected gears of said gear means, said gears on said supplemental shafts being so arranged with respect to said first named gear means that when in engagement they will not tend to cause disengagement upon rotation of said first named shaft, and means for setting said second named gears including a fixed member and a movable notched member, the position of the notches in said notched member corresponding to the position of the gears of said concentric gear means.

16. In a device of the character described, the combination of a shaft adapted to be operatively connected to indicating means, gear means concentrically arranged about a vertical axis and rotated by said shaft, supplemental shafts disposed adjacent said gear means, differential means operatively connected to said supplemental shafts and adapted to be connected to a second indicating means, a gear carried by each of said supplemental shafts for rotating said shafts, each of said gears being disposed on an arm carried by each of said supplemental shafts, said gears being engageable with selected gears of said gear means, said arms extending toward the direction of rotation of said first named gear means whereby when in engagement they will not tend to cause disengagement upon rotation of said first named shaft, and means for setting said arms including a fixed member and a movable notched member, the position of the notches in said notched member corresponding to the position of the gears of said concentric gear means.

17. In a device of the character described, the combination of a drive shaft adapted to be connected to indicating mechanism, gear steps mounted to rotate with said drive shaft, a supplemental shaft disposed adjacent said gear steps and being substantially parallel to the axis of said gear steps, a driven shaft adapted to be connected to other indicating means, means connecting said driven and supplemental shafts, a housing member movably mounted on said supplemental shaft and provided with an arm having a gear adapted to engage the selected gear steps, a connection between said last named gear and said supplemental shaft, said housing member being provided with a rack and an elongated gear, a setting shaft, a rack provided on said setting shaft engaging said elongated gear, a pinion slidably but non-rotatably mounted with respect to said setting shaft and engaging said first named rack, and means for preventing movement of said setting shaft when said first named gear is in engagement with a selected gear step.

18. In a device of the character described, the combination of a drive shaft adapted to be connected to indicating mechanism, gear steps mounted to rotate with said drive shaft, a supplemental shaft disposed adjacent said gear steps and being substantially parallel to the axis of said gear steps, a driven shaft adapted to be connected to other indicating means, means connecting said driven and supplemental shafts, a housing member movably mounted on said supplemental shaft and provided with an arm having a gear adapted to engage the selected gear steps, a connection between said last named gear and said supplemental shaft, said housing member being provided with a rack and an elongated gear, a setting shaft, a rack provided on said setting shaft engaging said elongated gear, a pinion slidably but non-rotatably mounted with respect to said setting shaft and engaging said first named rack, an index member and a stop member associated with said setting shaft and being so constructed and arranged that the index and stop members may be engaged to prevent rotation of said housing member and disconnection of said first named gear and a selected gear step until said setting shaft has been bodily moved.

19. In a device of the character described, the combination of a drive shaft adapted to be connected to indicating mechanism, gear steps mounted to rotate with said drive shaft, a supplemental shaft disposed adjacent said gear steps and being substantially parallel to the axis of said gear steps, a driven shaft adapted to be connected to other indicating means, means connecting said driven and supplemental shafts, a housing member movably mounted on said supplemental shaft and provided with an arm having a gear adapted to engage the selected gear steps, a connection between said last named gear and said supplemental shaft, said housing member being provided with a rack and an elongated gear, a setting shaft, a rack provided on said setting shaft engaging said elongated gear, a pinion slidably but non-rotatably mounted with respect to said setting shaft and engaging said first named rack, an index member and a stop member associated with said setting shaft and being so constructed and arranged that the index and stop members may be engaged to prevent rotation of said housing member and disconnection of said first named gear and a selected gear step until said setting shaft has been bodily moved, and resilient means urging said index and stop members into engagement.

20. In a device of the character described, the combination of a drive shaft adapted to be connected to indicating mechanism, gear steps mounted to rotate with said drive shaft, a supplemental shaft disposed adjacent said gear steps and being substantially parallel to the axis of said gear steps, a driven shaft adapted to be connected to other indicating means, means connecting said driven and supplemental shafts, a housing member movably mounted on said supplemental shaft and provided with an arm having a gear adapted to engage the selected gear steps, a connection between said last named gear and said supplemental shaft, said housing member being provided with a rack and an elongated gear, a setting shaft, a rack provided on said setting shaft engaging said elongated gear, a pinion slidably but non-rotatably mounted with respect to said setting shaft and engaging said first named rack, an index member and a stop member associated with said setting shaft, said index member being notched, the notches being so disposed that when said stop memebr is in a notch said first named gear engages a corresponding gear step, said index member being provided with sloping portions between said notches, and resilient means urging said index and stop members into engagement, said resilient means causing relative movement between said index and stop members if said stop member engages a sloping portion whereby said notches will receive said stop member and said first named gear will mesh with a gear step.

21. In a device of the character described, the combination of a driving shaft, concentrically arranged gear means driven by said shaft, a gear for selectively engaging said concentrically arranged gear means, means movable with said gear providing a support therefor, means for selectively moving said gear including a shaft rotatable to move said gear to selected position, said shaft being bodily movable to selectively disengage and engage said gear with said gear means.

22. In a device of the character described, the combination of a driving shaft, concentrically arranged gear means driven by said shaft, a gear for selectively engaging said concentrically arranged gear means, means movable with said gear providing a support therefor, means for selectively moving said gear including a shaft rotatable to move said gear to selected position, said shaft being bodily movable to selectively disengage and engage said gear with said gear means, and indicating means controlled by said second named shaft for showing the setting of said gear.

23. In a device of the character described, the combination of a driving shaft, concentrically arranged gear means driven by said shaft, a gear for selectively engaging said concentrically arranged gear means, means movable with said gear providing a support therefor, means for selectively moving said gear including a shaft rotatable to move said gear to selected position, fixed and rotary means associated with said second named shaft and relatively movable in accordance with the selected engagement between said gear and gear means for preventing accidental disengagement between said gear and gear means.

24. In a device of the character described, the combination of a driving shaft, concentrically arranged gear means driven by said shaft, a gear for selectively engaging said concentrically arranged gear means, means movable with said gear providing a support therefor, means for selectively moving said gear including a shaft rotatable to move said gear to selected position, fixed and rotary means associated with said second named shaft and relatively movable in accordance with the selected engagement between said gear and gear means for preventing accidental disengagement between said gear and gear means, and indicating means controlled by said second named shaft for showing the setting of said gear.

HARVEY L. SPAUNBURG.
EDWARD WILD.
OTTO WILD, Jr.